US008095098B2

(12) United States Patent
Brooks et al.

(10) Patent No.: US 8,095,098 B2
(45) Date of Patent: Jan. 10, 2012

(54) APPARATUS AND METHODS FOR NETWORK INTERFACE AND SPECTRUM MANAGEMENT

(75) Inventors: Paul D. Brooks, Weddington, NC (US); Robert L. Romerein, Pontypool (CA)

(73) Assignee: Time Warner Cable Inc., New York, NY (US)

( * ) Notice: Subject to any disclaimer, the term of this patent is extended or adjusted under 35 U.S.C. 154(b) by 1485 days.

(21) Appl. No.: 11/143,120

(22) Filed: Jun. 1, 2005

(65) Prior Publication Data

US 2005/0283815 A1    Dec. 22, 2005

Related U.S. Application Data

(60) Provisional application No. 60/576,280, filed on Jun. 1, 2004.

(51) Int. Cl.
*H04B 1/18* (2006.01)
(52) U.S. Cl. ............... 455/182.1; 455/188.1; 455/180.1; 725/127; 725/117
(58) Field of Classification Search .................. 455/282, 455/424, 425, 456.6, 550.1, 575.1, 2.01, 455/3.01, 426.1, 454, 428, 414.1, 3.06, 3.03, 455/559, 283, 295, 296, 307, 278.1, 136, 455/180.1–188.2; 725/149, 111, 107–110, 725/112–127, 128–131; 348/14.01, 607, 348/683, 554, 555
See application file for complete search history.

(56) References Cited

U.S. PATENT DOCUMENTS

| 3,582,835 | A | * | 6/1971 | Walding | 333/174 |
| 3,924,187 | A | * | 12/1975 | Dormans | 725/125 |
| 4,367,557 | A | * | 1/1983 | Stern et al. | 725/149 |
| 4,534,024 | A | | 8/1985 | Maxemchuk et al. | |
| 4,970,722 | A | | 11/1990 | Perschutti | |
| 4,982,440 | A | * | 1/1991 | Dufresne et al. | 725/125 |
| 5,499,047 | A | * | 3/1996 | Terry et al. | 725/127 |
| 5,745,838 | A | * | 4/1998 | Tresness et al. | 725/128 |
| 5,805,806 | A | | 9/1998 | McArthur | |
| 5,815,794 | A | | 9/1998 | Williams | |
| 5,826,167 | A | * | 10/1998 | Jelinek et al. | 725/121 |
| 5,881,362 | A | * | 3/1999 | Eldering et al. | 725/125 |
| 5,884,596 | A | * | 3/1999 | Hara et al. | 123/90.65 |
| 5,893,024 | A | * | 4/1999 | Sanders et al. | 725/125 |
| 6,049,693 | A | * | 4/2000 | Baran et al. | 725/124 |
| 6,160,571 | A | * | 12/2000 | Wang | 725/127 |
| 6,160,990 | A | * | 12/2000 | Kobayashi et al. | 725/135 |

(Continued)

FOREIGN PATENT DOCUMENTS

WO    WO 02/21841 A1    3/2002

*Primary Examiner* — Duc Nguyen
*Assistant Examiner* — Charles Chow
(74) *Attorney, Agent, or Firm* — Gazdzinski & Associates, PC

(57) ABSTRACT

Apparatus and methods for the management of radio frequency spectrum within a network such as a CATV network. In one aspect of the invention, an improved signal reflector apparatus adapted for use in the network is disclosed, the reflector circuit being designed to strongly reflect signal frequencies at the lower end of the CATV reverse band, and/or above the higher end of the forward band, while simultaneously allowing the rest of the reverse band and the entire forward band to pass freely through the device. This selective filtering of the spectrum allows control signals generated within a premises or private network to be directed (by reflection) to other devices within that network. A blocking element (e.g., amplifier) may also be used to provide control of the transmission and attenuation profile of the reflector apparatus. The passage of power signals such as DC or low frequency AC is also optionally provided.

33 Claims, 9 Drawing Sheets

U.S. PATENT DOCUMENTS

| | | |
|---|---|---|
| 6,181,777 B1 | 1/2001 | Kiko |
| 6,188,750 B1 | 2/2001 | Kiko |
| 6,212,259 B1 | 4/2001 | Kiko |
| 6,323,743 B1* | 11/2001 | Zelenz et al. ............. 333/185 |
| 6,348,837 B1 | 2/2002 | Ibelings |
| 6,369,699 B1* | 4/2002 | Liu ...................... 340/538.11 |
| 6,404,347 B1 | 6/2002 | Kiko |
| 6,472,992 B1 | 10/2002 | Kiko |
| 6,504,906 B1 | 1/2003 | Kiko |
| 6,563,801 B2 | 5/2003 | Makinen et al. |
| 6,643,566 B1 | 11/2003 | Lehr et al. |
| 6,794,957 B2* | 9/2004 | Shafer et al. ............. 333/185 |
| 6,888,883 B1* | 5/2005 | Schwartzman et al. ...... 375/222 |
| 7,047,555 B1* | 5/2006 | Inaguma et al. ............. 725/149 |
| 7,093,276 B2* | 8/2006 | Sugiura et al. ............. 725/127 |
| 7,138,886 B2* | 11/2006 | Strull et al. ............. 333/109 |
| 2001/0030785 A1 | 10/2001 | Pangrac et al. |
| 2002/0069417 A1 | 6/2002 | Kliger et al. |
| 2002/0083476 A1 | 6/2002 | McNamara |
| 2003/0066082 A1 | 4/2003 | Kliger et al. |
| 2003/0194241 A1 | 10/2003 | Farmer |
| 2003/0218697 A1 | 11/2003 | Kovacic |
| 2004/0068739 A1 | 4/2004 | Russ et al. |
| 2004/0068747 A1 | 4/2004 | Robertson et al. |
| 2004/0192194 A1* | 9/2004 | Zhen et al. ............. 455/11.1 |
| 2004/0214537 A1* | 10/2004 | Bargroff et al. ............. 455/136 |
| 2005/0005287 A1 | 1/2005 | Claussen |
| 2005/0210529 A1* | 9/2005 | Pavlic et al. ............. 725/127 |
| 2005/0289632 A1* | 12/2005 | Brooks et al. ............. 725/126 |
| 2007/0061861 A1* | 3/2007 | Strull et al. ............. 725/118 |
| 2008/0055017 A1* | 3/2008 | Shafer ............. 333/132 |

\* cited by examiner

APPARATUS AND METHODS FOR NETWORK INTERFACE AND SPECTRUM MANAGEMENT

PRIORITY AND RELATED APPLICATIONS

This application claims priority to U.S. Provisional Application Ser. No. 60/576,280 filed Jun. 1, 2004 and entitled "APPARATUS AND METHODS FOR NETWORK SPECTRUM MANAGEMENT", which is incorporated herein by reference in its entirety. This application is also related to U.S. patent application Ser. No. 11/143,119 filed contemporaneously herewith and entitled "CONTROLLED ISOLATION SPLITTER APPARATUS AND METHODS".

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF INVENTION

The present invention relates generally to the field of networks such as those adapted for distributing content, and specifically in one aspect to the control and utilization of the radio frequency (RF) and other spectra and signals on a cable network.

DESCRIPTION OF THE RELATED TECHNOLOGY

Radio frequency (RF) networks, such as those used based on coaxial cable and optical fiber transmission infrastructure (so-called "hybrid fiber-coax" or HFC networks) are well known in the prior art. Such networks are used, for example, to deliver residential cable television services. A portion of the network (typically closer to the core or head-end) utilizes optical fiber to transmit data and content, and at certain distribution points or hubs within the network, these optical signals are transformed into electromagnetic or radio frequency signals for transmission over the installed base of coaxial cable to the subscriber's premises.

Coaxial cable provides a transmission medium for Radio Frequency signals that maintains a constant impedance (effectively, the balance of resistance, inductance and capacitance) along its length and contains the electromagnetic energy within its structure so it can be directed to specific destinations within the network. A constant impedance is conducive to the efficient propagation of radio waves without reflection. Abrupt changes in the impedance cause a portion of the power to be reflected. Losses due to this phenomenon are known as reflection losses or return losses. The power loss associated with signal transmission along the cable is due to the absorption of a fraction of the power by the dielectric material in the core of the cable. This power loss is greater as the frequency of the signal increases, and is commonly referred to as transmission loss or insertion loss.

As signals propagate through a coaxial cable network, losses due to transmission through cable and passive devices reduce the useable signal level. Signal receivers such as television sets and other consumer premises equipment (CPE) require a certain signal power to assure proper performance (e.g., a clear picture that is free from noise). RF amplifiers are used to increase the signal power at any point in the network to maintain a proper signal-to-noise ratio (SNR) or carrier-to-noise ratio (CNR). Amplification is generally directional, meaning that signals propagating toward the input of the amplifier are increased at the output but signals propagating toward the output of the amplifier (i.e., in reverse) are attenuated at the input.

A signal path in a coaxial network may be split into two or more separate paths through the use of passive splitters. Splitters may also be used to combine multiple signal paths into one path. These devices divide the total signal power at the input between the various output ports while preserving the characteristic impedance of the network to minimize reflection loss as the paths are split. As a result, the output ports are isolated from each other. This means that signals entering the output ports encounter much more attenuation in any paths to an adjacent output port than is encountered in the path to the input port.

It is also desirable to match the impedance at any port of a coaxial device to the impedance of the cable so as to minimize the chance of reflections, which can interfere with the primary signal stream. Reflections that are out of phase with the primary signal stream can cause "ghosts" in analog-modulated signals or data recognition errors in digital signals.

Various types of consumer premises equipment (CPE) are used in coaxial cable (e.g., RF/HFC) networks, the most ubiquitous being the well known set-top box (STB). The STB (and its digital cousin, the DSTB) include a radio frequency receiver and related components adapted to receive the signals carried over the coaxial portion of the network, demodulate them, decrypt them as necessary, and extract the transmitted content for viewing, recording, etc. by the subscriber.

STBs may also communicate with one another in a given premises. A subscriber node is a private radio frequency network within the subscriber's premise. The interface between the public (MSO) network and this private premises network is known as the demarcation point. Typically, such STB to STB communication is performed by reflecting signals off of a device such as the aforementioned splitter that is installed at the demarcation point of the premises (or nearby). Signals are simultaneously reflected in two or more separate frequency bands; one band is used for reverse (primarily control signal) transmission, and another band is used for forward (primarily digital video) transmission. One significant disability with this approach, however, is that the forward transmission reflector-filter prevents desired digital video signals in adjacent frequency bands from entering the premises, thereby restricting the spectrum available for revenue-producing programming. This is in effect throwing away perfectly usable bandwidth that could be otherwise utilized to carry content or other signals/data.

One prior art approach to demarcation point reflection and filtration is the Multi-Room Digital Video Recorder (MR-DVR) manufactured by Scientific-Atlanta. This device comprises a Splitter Isolation Module (SIM) which reflects both forward and reverse signals, and does not contain amplifier circuitry or power passing circuitry. The SIM operates on the principle of reflection, and employs a band-stop filter in the forward direction and a high pass filter in the reverse direction. The forward band-stop filter provides the needed blocking function, and the device does not pass power to the STB.

A variety of other approaches to subscriber node networking and signal reflection/filtration in content-based networks (such as the aforementioned HFC cable network) are known in the prior art. For example, U.S. Pat. No. 4,534,024 to Maxemchuk, et al. issued on Aug. 6, 1985 and entitled "System and method for controlling a multiple access data communications system including both data packets and voice packets being communicated over a cable television system" discloses a communications system and method for controlling both digital voice traffic and digital data traffic including a communications path, a source station and a destination station. The source and destination stations are respectively adapted to be coupled to a source station home network and to a destination station home network. The source station is further adapted to transmit a signaling packet on a first transmit control channel. The signaling packet is for signaling a destination station that the source station has an information packet intended for the destination station. The destination station is adapted to detect the signaling packet on a second receive control channel. The signaling packet includes a field for identifying the source station which has the information packet intended for the destination station. In response to the signaling packet, the destination station is coupled to the source home network. Thereafter, information packets may be transmitted from the source station on a third control channel and then be translated to a source station home network channel for transmission to the destination station.

U.S. Pat. No. 4,970,722 to Preschutti issued on Nov. 13, 1990 and entitled "Broadband local area network" discloses a broadband local area network that transmits outbound signals in an outbound frequency band and inbound signals in an inbound frequency band. In one configuration, the network comprises a central hub and a plurality of nodes connected to the hub. Each of the nodes comprises a bidirectional amplifier having a fixed gain across the entire inbound and outbound bandwidth and a line balancer. The line balancer includes a variable cable simulator circuit for simulating the loss of a variable amount of coaxial cable and an equalizer circuit for equalizing the loss of a fixed amount of coaxial cable. The network also includes a plurality of remote outlet clusters. Each remote outlet cluster is connected to one of the nodes by a coaxial transmission path and comprises a fixed attenuation and a RF splitter having a plurality of outlets for connection to user devices. The number of outlets of each remote outlet cluster depends on the length of the transmission path to the node to which it is attached.

U.S. Pat. No. 5,805,806 to McArthur issued on Sep. 8, 1998 and entitled "Method and apparatus for providing interactive networking between televisions and personal computers" discloses a local area network (LAN) that supports both baseband digital LAN signals and video, including television signals originating outside the network and local video generated within the network. The network may include personal computers, television receivers, video cassette recorders, printers, and video cameras. Connection circuitry permits each device to receive both the video and the digital LAN signals through a single coaxial cable connection. The connection circuitry includes a LAN transceiver for each device in the network to enable each device to transmit, receive, and decode digital LAN signals. A computer interface enables any personal computer in the network to receive and display television signals received by the network and video generated by another computer or other device. A television interface enables any television in the network to receive and display local video output by a personal computer or other device in the network and enables the television to be used as a remote monitor for the computer.

U.S. Pat. No. 5,815,794 to Williams issued on Sep. 29, 1998 entitled "Undesirable energy suppression system in the return path of a bidirectional cable network having dynamically allocated time slots" discloses a bidirectional cable network having a signal distribution system that prevents undesirable energy in the bidirectional cable network's return path from adversely effecting the entire network. The signal distribution system a first signal transmitted in a forward path direction over the bidirectional communication path from a headend to a plurality of remote points. Signals transmitted in a return path direction are time division multiplexed on a series of cyclically reoccurring time slots where at least one of the cyclically reoccurring time slots is assigned to each of the plurality of remote points. At least one primary return gate is effective during each occurrence of the cyclically reoccurring time slots for isolating all of the plurality of remote points from accessing the network to transmit a signal in second direction except for the one of the plurality of remote points which is assigned the cyclically reoccurring time slot that is presently providing a path to transmit in the second direction from the remote point to the headend. In one embodiment each return gate services a plurality of remote points within the return gate's distribution branch. In a second embodiment each remote point has a dedicated return gate.

U.S. Pat. No. 6,049,693 to Baran, et al. issued on Apr. 11, 2000 entitled "Upstream ingress noise blocking filter for cable television system" discloses a plurality of intelligently-controlled frequency-domain filters or ingress noise blockers that are disposed in serial connection to coaxial cable at feeder tap locations that connect each household node to the cable. Each filter is operative in the absence of upstream signals from the local node to block ingress energy in the upstream band and is responsive to energy produced by injected upstream signals in the upstream band only from the associated local node to unblock and thus pass information signals into the upstream band. The filter employs as its blocking/unblocking mechanism an active switch whose control signal, as well as power source, is the energy of the injected upstream signal, which may be largely the information-containing signal from the associated local node which is to be gated through to the head end. The switch is able to respond quickly to microvolt level signals. The active switch is preferably a depletion-mode-type field effect transistor (depletion mode FET).

U.S. Pat. No. 6,348,837 to Ibelings issued on Feb. 19, 2002 entitled "Bi-directional amplifier having a single gain block for amplifying both forward and reverse signals" discloses an amplifier including a first terminal for receiving forward signals in a first frequency band and a second terminal for receiving reverse signals in a second frequency band. A single gain block is coupled between the first terminal and the second terminal for amplifying the forward signals and the reverse signals. The forward signals, after amplification, are provided to the second terminal for transmission from the amplifier, and the reverse signals, after amplification, are provided to the first terminal for transmission from the amplifier. In this manner, both forward and reverse signals, which are transmitted in separate frequency bands, can be amplified by a single gain block.

U.S. Pat. No. 6,563,801 to Makinen, et al. issued on May 13, 2003 entitled "Cable interface for data and power supply" discloses a cable interface unit which allows use of the same wire in one cable both for base-band transmission of data between telecommunication equipment in full duplex form and also for transmission of an operating voltage from one device to another. In the transmission unit, data is transmitted through a hybrid connection to a cable. After the hybrid connection, the operating voltage is also brought to the cable with the aid of a diplexer. The hybrid connection separates the arriving data and conducts it to the receiver, where the data is shaped in an analog manner by correcting level distortions and thereupon in the digital signal processing a decision is made on what the received symbol is.

U.S. Pat. No. 6,643,566 to Lehr, et al. issued Nov. 4, 2003 entitled "System for power delivery over data communication cabling infrastructure" discloses a system for generating, delivering and distributing electrical power to network elements over a data communication network infrastructure within a building, campus or enterprise. The invention includes power/data combiners that combine a data communication signal with a low frequency power signal. The combined signal is transported over the LAN infrastructure where a power/data splitter extracts the data signal and the power signal and generates two separate outputs. The power over LAN system of the present invention operates with high bandwidth data communication networks, i.e., 10 Mbps, 100 Mbps, and 1000 Mbps. The electrical power distributed over the LAN can be delivered as DC or low frequency AC voltages which in either case will not interfere with data communications signals. The electrical power delivered over data communications cable can be transmitted using one or more spare pairs in the cable or over the receive and transmit wires.

U.S. patent application 20020069417 to Kliger, et al. published Jun. 6, 2002 entitled "Home network system and method" discloses a home network, in one embodiment including a home wiring system; a demarcation point unit in electrical communication with the home wiring system; and a home network module in electrical communication with the home wiring system. The home network module is adapted for connection to a home electronic device. The demarcation point unit passes data to and receives data from the home electronic device through the home network module.

U.S. patent application 20020083476 to McNamara published Jun. 27, 2002 entitled "Method and apparatus for reducing the flow of RF noise from subscriber's premise cable systems into the reverse transmission path of two-way cable networks" discloses a method and means for reducing the RF noise induced within cable networks within residences or businesses from entering hybrid fiber optic coax networks in the reverse (upstream) direction. The active unit consists of a set of diplex filters connected end to end which segregates the RF traffic into a forward (nominally 50-750/850 MHz) and a reverse (nominally 5-30/36/42 MHz) direction but with an amplifier placed in the low band path. In the simplest embodiment, the active unit is attached directly to an Network Interface Unit (NIU). Signals from the NIU are amplified as they pass through the active unit and are then transmitted through the premise distribution network. The active unit is designed to boost the signals before they are mixed with noise present within the subscriber's premise network. At a second point in the network, typically at the side of the home where the residential premise network connects to the outside cable plant, the network passes through a second passive unit. The passive unit consists of a pair of diplex filters but on the low band path of the diplex filter pair there is an attenuator which attenuates signals in the reverse direction by nominally 15-35 dB, depending upon the value chosen for the attenuator. The attenuator may be either fixed, variable, or a combination of both. The amplified RF signal and all noise that has entered the premise network cable system in the reverse path are attenuated and then passed through to the outside cable plant.

U.S. patent application 20030066082 to Kliger, et al. published Apr. 3, 2003 entitled "Home network system and method" discloses a demarcation point unit connected between a home network backbone and an external network. The demarcation point unit includes a blocking filter and splitter. The blocking filter receives a home network signal from the home network backbone and an external signal from the external network. The blocking filter separates the home network signal from the external signal, and returns the home network signal back to the home network backbone. The splitter has an input and at least two outputs. The input of the splitter receives the home network signal from the blocking filter.

U.S. patent application 20040068739 to Russ, et al. published Apr. 8, 2004 entitled "Networked multimedia system having a multi-room interactive network guide" discloses systems and methods for providing downstream signals to a plurality of receiver networks. A receiver network (i.e., a networked multimedia system) includes a splitter/isolation module (SIM), a primary set-top terminal (STT), and at least one remote device. The remote devices communicate with the primary STT via the SIM over coaxial cable. Accordingly, the remote devices utilize some or all of the features including hardware and software that are included in the primary STT via the networked multimedia system. A network guide is provided that displays the past and present activity status of each of the receiving devices.

U.S. patent application 20040068747 to Robertson, et al. published Apr. 8, 2004 entitled "Networked multimedia system" discloses systems and methods for providing downstream signals to a plurality of receiver networks. A receiver network (i.e., a networked multimedia system) includes a splitter/isolation module (SIM), a primary set-top terminal (STT), and at least one remote device. The remote devices communicate with the primary STT via the SIM over coaxial cable. Accordingly, the remote devices utilize some or all of the features including hardware and software that are included in the primary STT via the networked multimedia system.

U.S. patent application 20050005287 to Claussen published on Jan. 6, 2005 entitled "Networked multimedia overlay system" discloses systems and methods for providing encrypted downstream signals to a plurality of receiver devices, where the devices may have different decryption devices. A receiver network (i.e., a networked multimedia system) includes a splitter/isolation module (SIM), a primary set-top terminal (STT), and at least one remote device. The remote devices communicate with the primary STT via the SIM over coaxial cable. Accordingly, the remote devices are capable of requesting and receiving stored programs via the networked multimedia overlay system. Depending upon the decryption device included in the requesting remote STT, the primary STT sends a stored program encrypted according to that decryption device.

Despite the foregoing variety of approaches, there is still a salient need for an improved apparatus and methods for providing premises or "subscriber node" communications to occur, without unduly restricting the frequency bandwidth available in the downstream (i.e., network to premises) direction. Such improved apparatus would ideally be configured to reflect only the reverse direction signals (which are used for, e.g., on-premise control), thereby allowing the desired forward-bound video signals into the subscriber's site. Additionally, "forward" video signals generated on-premise would be blocked from exiting the premises without the need for a filter or similar components.

The improved apparatus would be comparatively simple in its construction (in order to provide low installation cost and a high degree of reliability), and would also be readily compatible with existing coaxial cable network topologies, as well as existing CPE (e.g., DSTB) implementations so as to allow retrofitting to the installed STB base if desired.

The device could also be configured to allow for the passage of low frequency or even DC power, such as e.g., for powering connected devices on the subscriber side of the demarcation point.

SUMMARY OF THE INVENTION

The present invention satisfies the foregoing needs by providing improved apparatus and methods for network interface and spectrum management.

In a first aspect of the invention, improved radio frequency apparatus for use in a network is disclosed. In one embodiment, the apparatus comprises a network interface circuit disposed at the demarcation point of between a public cable network and a subscriber premises network, the circuit being adapted to control the transmission properties across the interface by: substantially attenuating first signals within a first frequency band and traveling in a first direction relative to the circuit; passing second signals within a second frequency band and also traveling in the first direction (e.g., those in the 5-42 MHz band); and passing substantially all of third signals within both the first and second frequency bands and traveling in a second direction relative to the circuit. In one variant, the circuit includes one or more isolation amplifiers which provide the aforementioned transmission characteristics, including blocking signals above certain frequencies (e.g., above 50 MHz). The circuit is also adapted to pass low frequency or DC power signals for use in, e.g., powering connected devices across the interface.

In a second aspect of the invention, a method for managing frequency spectrum within a radio frequency network is disclosed. In one embodiment, the network includes a demarcation point between public and private portions, and the method comprises: substantially attenuating first signals within a first frequency band and traveling in a first direction relative to the demarcation point; passing second signals within a second frequency band and traveling in the first direction; and passing third signals within both the first and second frequency bands and traveling in a second direction relative to the demarcation point.

In a third aspect of the invention, reflector apparatus for use in a network is disclosed. In one exemplary embodiment, the apparatus is adapted to: substantially reflect first signals within a first frequency band and traveling in a first direction relative to the apparatus; substantially pass second signals within a second frequency band and traveling in the first direction; substantially pass third signals within the second frequency band and traveling in a second direction relative to the apparatus; and substantially pass fourth signals in a third frequency band, the third band being lower in frequency than the first or second bands. In one variant, the reflector apparatus includes power passing capability, and comprises: a plurality of capacitive elements placed in series between an first terminal and an second terminal, the capacitive elements forming a plurality of individual nodes, each of the nodes being located electrically between two of the capacitive elements; and a plurality of inductive elements, wherein a first end of each one of the plurality of inductive elements is electrically coupled to at least one of the nodes, and a second end of each of the plurality of inductive elements is electrically coupled, directly or indirectly, to ground potential. An isolation amplifier is also included to control the transmission and attenuation of signals across the device.

In another variant, the reflector apparatus comprises: a first plurality of capacitive elements placed in series between a first terminal and a second terminal, the first plurality of capacitive elements forming a plurality of individual nodes, each of the nodes being located electrically between two of the capacitive elements; a first plurality of inductive elements disposed in electrical parallel with respective ones of the first plurality of capacitive elements; and a second plurality of inductive elements, wherein a first end of each one of the second plurality of inductive elements is electrically coupled to at least one of the nodes, and a second end of each of the plurality of inductive elements is electrically coupled to at least one of a second plurality of capacitive elements, the at least one capacitive element also being electrically coupled to ground potential.

In a fourth aspect of the invention, interface apparatus for use in a content-based network is disclosed. In one embodiment, the apparatus comprises: an input port for coupling to a public portion of the network; an output port for coupling to a subscriber portion of the network; and a circuit including an isolation amplifier disposed electrically between the input and output ports. The circuit is adapted to: strongly reflect signals traveling from the output port toward the input port falling within a first frequency band; pass substantial portions of signals traveling from the output port toward the input port falling within a second frequency band; and attenuate signals traveling from the output port toward the input port falling within a third frequency band.

In a fifth aspect of the invention, a method of doing business is disclosed. In one embodiment, the method is utilized within a cable network comprising a public portion and a subscriber portion, and comprises: providing interface apparatus adapted to be installed at a demarcation point between the public portion and the subscriber portion, the circuit being adapted to selectively control the available frequency spectrum in both of upstream and downstream directions; providing first services to the subscriber portion with the interface apparatus operating in a first mode; selectively causing the interface apparatus to operate in a second mode; and providing second services to the subscriber portion with the interface apparatus operating in the second mode; wherein the first and second services are not identical.

In a sixth aspect of the invention, a method for providing subscriber-side networking capability is disclosed. In one embodiment, this capability is provided within a cable network having a public portion, subscriber-side network, and a demarcation point, with the method comprising: substantially reflecting first signals within a first frequency band and traveling towards the demarcation point within the subscriber-side network; passing second signals within a second frequency band, the second signals also traveling towards the demarcation point within the subscriber-side network; and passing third signals within both the first and second frequency bands, the third signals traveling away from the demarcation point within the subscriber-side network; wherein the first signals are utilized at least in part to provide communications between individual nodes within the subscriber-side network.

BRIEF DESCRIPTION OF THE DRAWINGS

The above and other features and advantages of the present invention are hereinafter described in the following detailed description of illustrative embodiments to be read in conjunction with the accompanying drawings and figures, wherein.

DETAILED DESCRIPTION OF THE INVENTION

Figure 1:
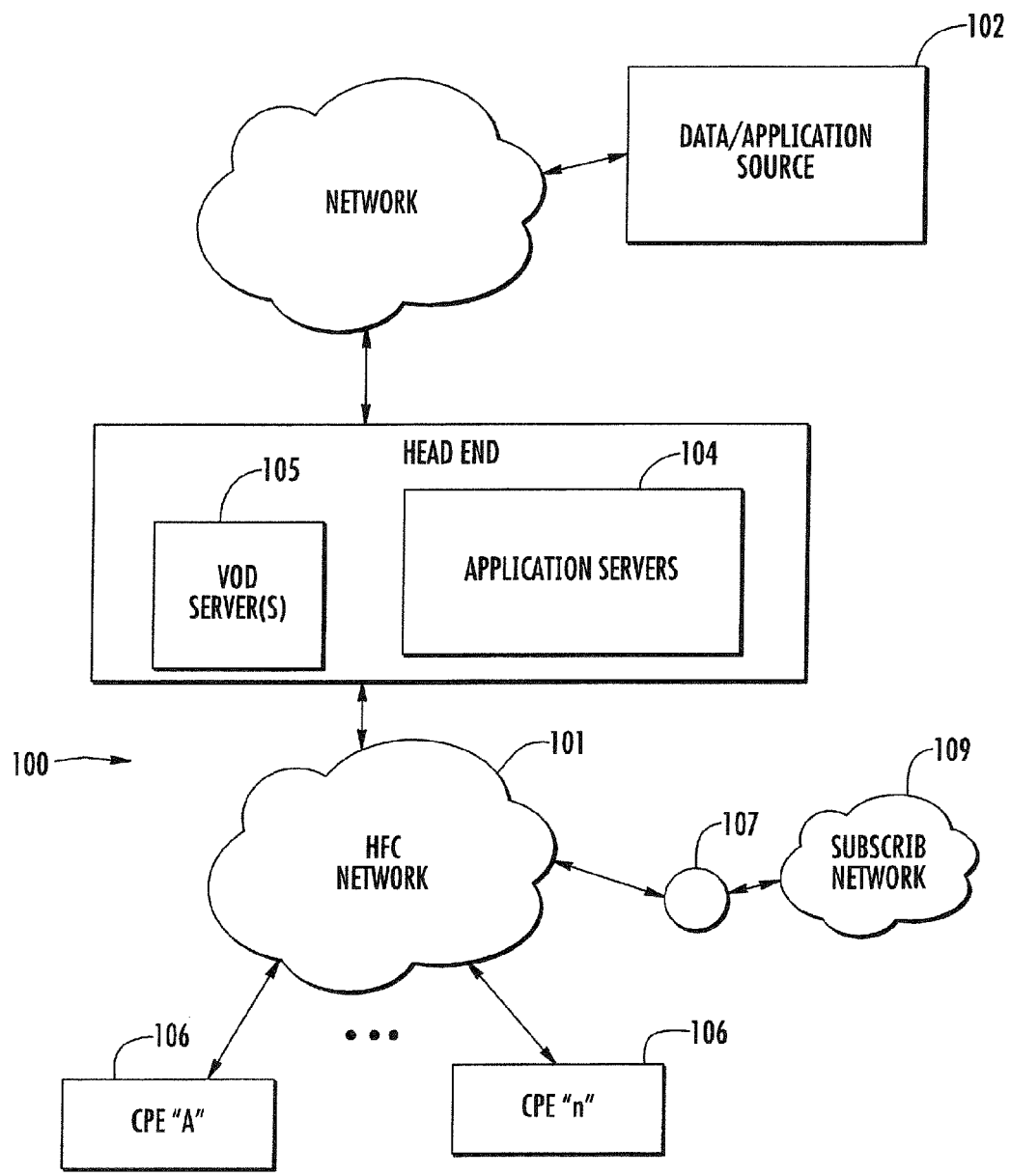
FIG. 1 is a functional block diagram illustrating an exemplary HFC network configuration useful with the present invention.

Reference is now made to the drawings wherein like numerals refer to like parts throughout.

As used herein, the terms "network" and "bearer network" refer generally to any type of telecommunications or data network including, without limitation, hybrid fiber coax (HFC) networks, satellite networks, telephony networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, ATM, X.25, Frame Relay, 3GPP, 3GPP2, WAP, SIP, UDP, FTP, RTP/RTCP, H.323, etc.).

As used herein, the term "head-end" refers generally to a networked system controlled by an operator (e.g., an MSO or multimedia specific operator) that distributes programming to MSO clientele using client devices. Such programming may include literally any information source/receiver including, inter alia, free-to-air TV channels, pay TV channels, interactive TV, and the Internet. DSTBs may literally take on any configuration, and can be retail devices meaning that consumers may or may not obtain their DSTBs from the MSO exclusively. Accordingly, it is anticipated that MSO networks may have client devices from multiple vendors, and these client devices will have widely varying hardware capabilities. Multiple regional head-ends may be in the same or different cities.

As used herein, the terms "client device" and "end user device" include, but are not limited to, personal computers (PCs) and minicomputers, whether desktop, laptop, or otherwise, set-top boxes such as the Motorola DCT2XXX/5XXX and Scientific Atlanta Explorer 2XXX/3XXX/4XXX/6XXX/8XXX series digital devices, personal digital assistants (PDAs) such as the Apple Newton®, "Palm®" family of devices, handheld computers such as the Hitachi "VisionPlate", personal communicators such as the Motorola Accompli devices, Motorola EVR-8401, J2ME equipped devices, cellular telephones, or literally any other device capable of interchanging data with a network.

Similarly, the terms "Consumer Premises Equipment (CPE)" and "host device" refer to any type of electronic equipment located within a consumer's or user's premises and connected to a network. The term "host device" refers generally to a terminal device that has access to digital television content via a satellite, cable, or terrestrial network. The host device functionality may be integrated into a digital television (DTV) set. The term "consumer premises equipment" (CPE) includes such electronic equipment such as set-top boxes, televisions, Digital Video Recorders (DVR), gateway storage devices (Furnace), and ITV Personal Computers.

As used herein, the term "network agent" refers to any network entity (whether software, firmware, and/or hardware based) adapted to perform one or more specific purposes. For example, a network agent may comprise a computer program running in server belonging to a network operator, which is in communication with one or more processes on a CPE or other device.

As used herein, the term "server" refers to any computerized component, system or entity regardless of form which is adapted to provide data, files, applications, content, or other services to one or more other devices or entities on a computer network.

As used herein, the term "computer program" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.) and the like.

As used herein, the terms "resistor" and "resistive element" refer generally to any signal conditioning or electrical component or device regardless of form, which provides a substantially real (non-imaginary) impedance. Examples of resistive elements include, without limitation, chip resistors, axial resistors, copper traces, and wire. Such resistors or resistive elements may be discrete devices, or integrated with other devices (such as within a semiconductor or integrated circuit device).

As used herein, the terms "capacitor" and "capacitive element" refer generally to any signal conditioning or electrical component or device regardless of form, which provides a capacitance or substantially negative complex impedance. Examples of capacitive elements are chip capacitors, leaded capacitors, and any set of conductive elements separated by a dielectric material with the ability to store charge. Such capacitors or capacitive elements may be discrete devices, or integrated with other devices (such as within a semiconductor or integrated circuit device).

As used herein, the terms "inductor" and "inductive element" refer generally to any signal conditioning or electrical component or device regardless of form, which provides an inductance or substantially positive complex impedance. Examples of inductive elements are chip inductors, wound toroids, "E" cores or the like, air coils, copper traces and wires or any other conductor in which an electromotive force is induced as the result of a changing magnetic flux. Such inductors or inductive elements may be discrete devices, or integrated with other devices (such as within a semiconductor or integrated circuit device).

Overview

In one salient aspect, the present invention provides improved apparatus and methods for enhancing and managing the spectrum (and bandwidth) available for communications to (and from) a premises. As previously discussed, prior art set-top to set-top transmission in the physical domain is performed by reflecting signals off of a device installed at the entry or demarcation point of the premises, which also prevents signals in adjacent frequency bands from entering the premises, thereby restricting the spectrum available for revenue-producing programming. The present invention overcomes this problem in that only the spectrum being used by terminal devices (e.g., set-tops) for communication within the premises is blocked or disallowed; all other network capacity remains usable. Accordingly, increased frequency spectrum is made available for, e.g., carrying content downstream into the premises.

In one exemplary embodiment, the invention comprises a set-top or other client device that is configured to reflect signals below one or more filter pass-bands that appear at the output port, back towards the source. This purposeful capability is intended to facilitate communications between multiple devices beyond (i.e., on the premises side of) the output port. Depending on the version, the exemplary configuration blocks signals at the output from being transmitted across the device in the reverse direction towards the input (e.g., CATV network) side. Two primary versions of this device are described: (i) an active version containing amplifier circuitry, and (ii) a passive version with circuitry designed to pass DC and/or line-frequency AC current across the device.

In one exemplary embodiment of the active version, amplifier circuitry is used to block or severely attenuate the transmission of signals in the reverse direction (from output to input) above a specified frequency, or alternatively in one or more specified bands. A broadband amplifier used in this fashion is commonly referred to as an isolation amplifier. This amplifier employs diplex filter circuits to allow signals above the diplex filter crossover band to pass though the device from input to output. Signals below the diplex filter crossover band but above the high-pass filter blocking band are allowed to pass from the output side in the reverse direction to the input side, and in some implementations, may be allowed to pass in both directions. Signals below the high-pass filter band are blocked from passing through the device in either direction, and additionally are reflected at the output port of the device.

Alternatively, the exemplary embodiment of the passive version of the device uses circuitry to pass DC and/or line-frequency AC current across the high-pass filter for the purpose of providing a source of power to an external amplification device such that this external amplifier can provide the function of blocking signal transmission in the reverse direction, thereby fulfilling the role of isolation amplifier. Signals above the filter passband are allowed to pass though the device.

In either case, the devices referenced above may or may not provide signal power gain as desired.

Applications of the reflector apparatus and methods include for example premises set-top to set-top control signal transmission, and the associated prevention of video signal egress from the premises. For example, if a set-top device has stored programs, when other set-tops within the premises are viewing or accessing these programs, the reflector apparatus of the present invention prevents these digital video signals from exiting the premises. Simultaneously, on-premises control signal communication is facilitated by virtue of the high-pass signal reflection capability. Other device-to-device on-premises communication needs using existing broadband coaxial wiring will benefit from this invention as well.

DETAILED DESCRIPTION OF EXEMPLARY EMBODIMENTS

Exemplary embodiments of the methods and apparatus of the invention are now described in detail with reference to FIGS. 1-5. While these exemplary embodiments are described in the context of HFC or similar cable networks used to supply residential premises, the general principles and apparatus of the invention may be extended to other types of architectures and networks, whether broadband, narrowband, or otherwise, the following therefore being merely exemplary in nature.

It will also be appreciated that while described generally in the context of a residential or home domain, the present invention may be readily adapted to other types of environments (e.g., commercial/enterprise, government/military, etc.) as well.

Furthermore, while described primarily in the context of CATV networks operating in the MHz range (and various sub-bands therein), it will be appreciated that the apparatus and methodologies of the invention may be adapted to literally any frequency range with the proper selection of components.

Coaxial cable provides a transmission medium for Radio Frequency signals that maintains a constant impedance (effectively, the balance of resistance, inductance and capacitance) along its length and contains the electromagnetic energy within its structure so it can be directed to specific destinations within the network. A constant impedance is conducive to the efficient propagation of radio waves without reflection. Abrupt changes in the impedance cause a portion of the power to be reflected. Losses due to this phenomenon are known as reflection losses or return losses. The power loss associated with signal transmission along the cable is due to the absorption of a fraction of the power by the dielectric material in the core of the cable. This power loss is greater as the frequency of the signal increases, and is commonly referred to as transmission loss or insertion loss.

As signals propagate through a coaxial cable network, losses due to transmission through cable and passive devices reduce the useable signal level. Signal receivers such as television sets and other consumer premises equipment (CPE) require a certain signal power to assure proper performance (e.g., a clear picture that is free from noise). RF amplifiers are used to increase the signal power at any point in the network to maintain a proper signal-to-noise ratio (SNR) or carrier-to-noise ration (CNR). Amplification is generally directional, meaning that signals propagating toward the input of the amplifier are increased at the output but signals propagating toward the output of the amplifier (i.e., in reverse) are attenuated at the input.

System Architecture

Figure 1A:
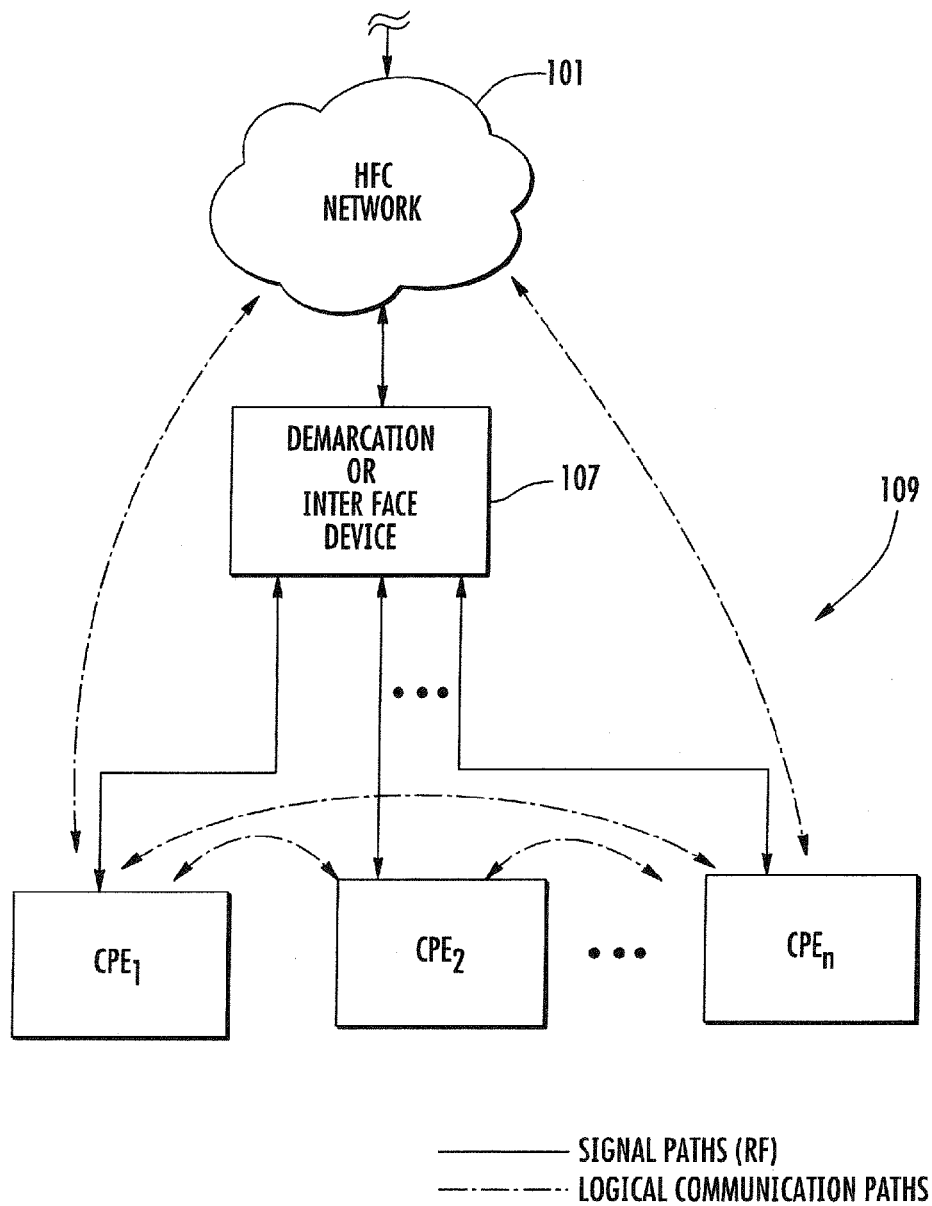
FIG. 1a is a functional block diagram illustrating an exemplary subscriber premises network which communicates with the HFC (public) network of FIG. 1.

FIGS. 1 and 1*a* illustrates a typical content-based network configuration within which the filtration/reflection apparatus and methodology of the present invention may be used. The various components of the network 100 include (i) one or more data and application origination points 102; (ii) one or more application distribution servers 104; (iii) one or more VOD servers 105, and (iv) customer premises equipment (CPE) 106. The distribution server(s) 104, VOD servers 105 and CPE(s) 106 are connected via a bearer (e.g., HFC) network 101. A demarcation point 107 exists at the point where the HFC network 101 meets the premises network 109 (see FIG. 1*a*). A simple architecture comprising one of each of the aforementioned components 102, 104, 105, 106, 107, 109 is shown in FIG. 1 for simplicity, although it will be recognized that comparable architectures with multiple origination points, distribution servers, VOD servers, and/or CPE devices (as well as different network topologies) may be utilized consistent with the invention.

The application origination point 102 comprises any medium that allows an application (such as a data download application or VOD-based application) to be transferred to a distribution server 104. This can include for example an application vendor website, CD-ROM, external network interface, mass storage device (e.g., RAID system), etc. Such transference may be automatic, initiated upon the occurrence of one or more specified events (such as the receipt of a request packet or ACK), performed manually, or accomplished in any number of other modes readily recognized by those of ordinary skill.

The application distribution server 104 comprises a computer system where such applications can enter the network system. Distribution servers are well known in the networking arts, and accordingly not described further herein.

The VOD server 105 a computer system where on-demand content, as well as the data discussed in greater detail below) can be received from one or more data sources 102 and enter the network system. These sources may generate the content/data locally, or alternatively act as a gateway or intermediary from a distant source. The VOD server 105 includes the Session Resource Manager (SRM) functionality, and asks the Digital Network Control System (DNCS) for resources. The DNCS responds with negative or positive response to the request, and the VOD server implements the appropriate resource allocation logic.

The CPE 106 includes any equipment in the customers' premises (or other locations, whether local or remote to the distribution server 104) that can be accessed by a distribution server 104 or the network in general. Such CPEs 106 comprise processors and associated computer memory (and optionally mass storage) adapted to store and run the downloaded or resident application, as well as receive and store the streamed in-band content and data, such as for example in the form of a DSTB. The CPE may also comprise a local server device for a local premises network or subscriber node (e.g., LAN) that communicates over the installed cable system of the premises. This premises network makes use of the reflective and filtering capabilities of the present invention, as described in greater detail subsequently herein.

As shown in FIG. 1*a*, the demarcation point 107 typically comprises a device (e.g., interface circuit, splitter, reflector or the like). As described in greater detail subsequently herein, the present invention outfits this interface device 107 with a specially configured filter and reflector circuit that provides the desired frequency spectrum functions (including blocking of certain reverse frequency bands, and passing of certain forward or downstream frequency bands, as well as low-frequency AC or DC power passing capabilities), all within a simplified, low cost and spatially compact form factor.

Many other permutations of the foregoing system components and communication methods may also be used consistent with the present invention, as will be recognized by those of ordinary skill in the field. Furthermore, different network architectures may be used as well.

High-Pass Filter/Reflector with Blocking Provisions

Referring now to FIGS. 2-5, exemplary embodiments of the filter/reflector apparatus of the invention are described in detail. It will be noted that while described primarily in the context of an HFC cable television (CATV) network having one or more subscriber nodes, the apparatus and methods of the present invention can be readily adapted to other types of networks wherein coaxial cable or other type of RF carrier medium is utilized.

As shown in FIG. 1, the interface between the public and private network is known as the demarcation point 107. The exemplary embodiment of the high-pass filter/reflector with blocking provisions disclosed herein finds its primary application on the subscriber side of the demarcation point, although the device may also be used in other applications. In the illustrated embodiment, the reflector's function is to reflect the control signals from the CPE 106 (e.g., set-top box) to the server set-top, and prevent these signals from travelling further upstream to the public CATV network 101. This is best accomplished on the subscriber side of the demarcation point 107, where the signal paths within the subscriber network have been reduced to one path. This makes the reflection available to all paths downstream.

As is well known, a filter is a device in a signal path that selectively attenuates certain frequencies in the available spectrum. There are four basic types of filters: (i) low-pass filters attenuate all frequencies above the cut-off frequency; (ii) high-pass filters attenuate all; frequencies below the cut-off frequency; (iii) band-pass filters attenuate all frequencies except those in the pass-band; and (iv) band-stop filters attenuate only those frequencies in the stop-band. Numerous different configurations of discrete and/or integrated components are known in implementing these filters, such configurations being well known to those of ordinary skill in the electronic arts.

Signal frequencies that are in the attenuation bands of the foregoing filters are not allowed to pass through the filter (at least at any significant signal level). Instead, most of the signal is reflected back from the filter-input port.

The apparatus and methods of the present invention basically apply filtration and reflection concepts in a non-intuitive fashion within a network (e.g., CATV network). For example, while a high-pass filter circuit is familiar to those practiced in the art, such filter as used in the present invention has been designed to strongly reflect signal frequencies at the lower end of the CATV reverse band, while simultaneously allowing the rest of the reverse band and the entire forward band to pass freely through the device. This selective filtering of the spectrum allows control signals generated within a private network to be directed (by reflection) to other devices within that network, such as other CPE 106 within the subscriber node 109. Since these signal frequencies are not allowed to pass through the filter, they do not enter the public CATV network 101. However, it is desirable to pass DC or AC power through the high-pass reflector, such as to supply electrical power from an upstream node to the subscriber premises, or from one CPE to another within the premises network. This power-passing functionality is determined at least in part by the order in which the elements of the filter are arranged in the reflector circuit, such order being specifically chosen in the present invention.

Figure 2:
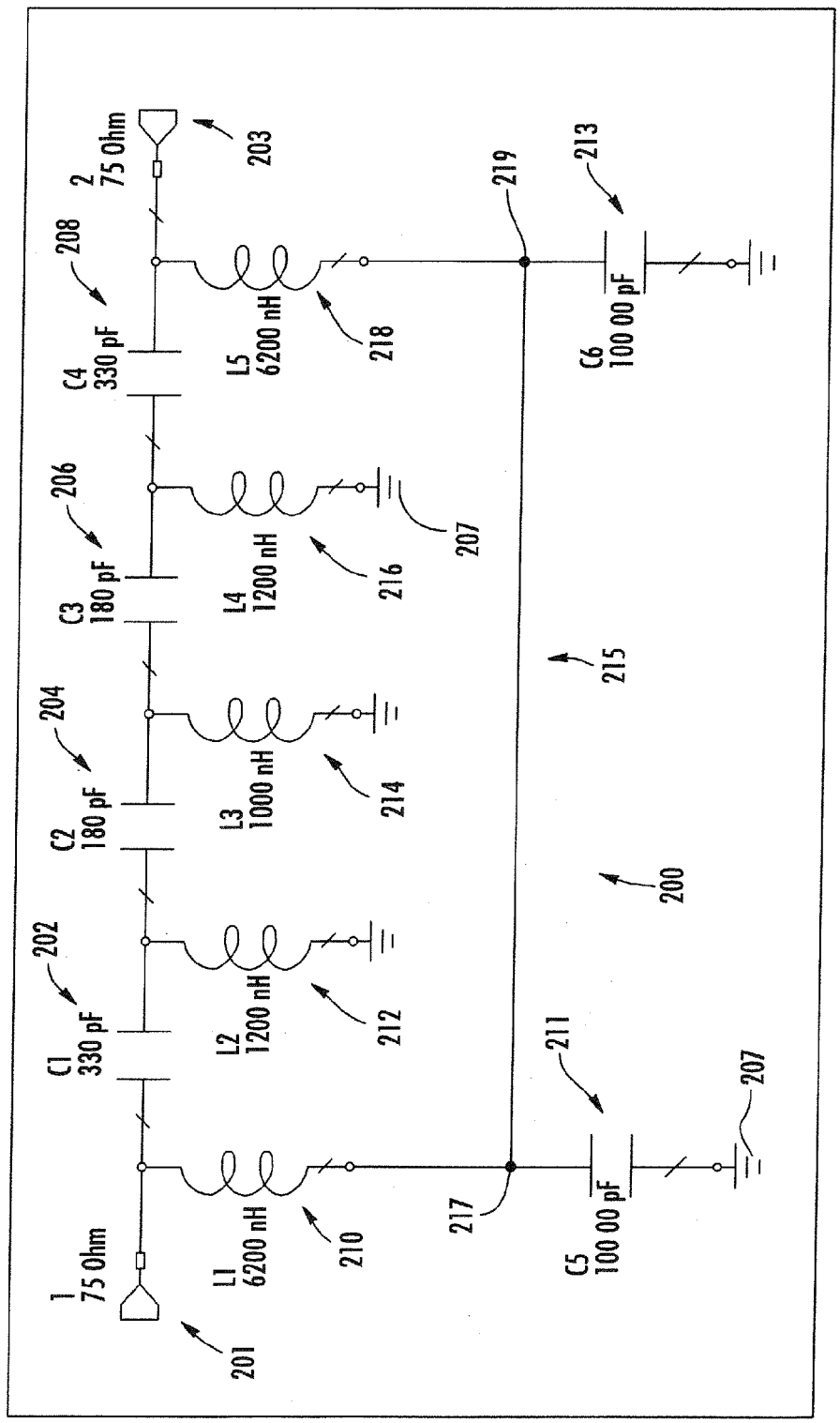
FIG. 2 is a schematic diagram of an exemplary configuration of a reflector circuit with power passing capability according to the invention.

FIG. 2 illustrates one exemplary embodiment of the high-pass reflector 200 of the invention that both enables on-premises RF networking, and protects the public cable network against interference from on-premises networking activity. It will be appreciated that while the illustrated circuit 200 of FIG. 2 is configured in order to interoperate with the Scientific-Atlanta MR-DVR platform, the circuit can be readily configured to interoperate with any number of different platforms (or even multiple platforms contemporaneously), the foregoing Scientific Atlanta device being merely exemplary.

As shown in FIG. 2, the circuit 200 generally comprises a series of capacitors (C1 202, C2 204, C3, 206, and C4 208) punctuated by respective ones of inductors (L1 210, L2 212, L3 214, L4 216 and L5 218) disposed generally in electrical parallel. The first and fifth inductors (L1 and L5) are respectively terminated to ground potential 207 through capacitors C5 211 and C6 213, while the remaining inductors C2, C3 and C4 are terminated directly to ground potential 207. The power passing path 215 is formed between the two nodes 217, 219 formed on the L1 and L5 legs of the circuit 200, respectively.

The input 201 and output 203 of the circuit 200 are coupled via standard 75-ohm coaxial connections, although other termination types and impedances may be used with proper adaptation. It will also be appreciated that while embodied as a set of discrete electrical components (i.e., inductors, resistors, and capacitors), the present invention can also readily be embodied as an integrated circuit device, or even a hybrid (i.e., mixed IC and discrete components).

Exemplary values for the aforementioned capacitors and inductors are shown in FIG. 2, although other values may be utilized with proper selection. The particular sequence of capacitances and inductances in the circuit 200 of FIG. 2 is also important to achieve the desired functionality; i.e., strong reflection of signal frequencies at the lower end of the reverse band, while simultaneously allowing the rest of the reverse band and the entire forward band to pass freely through the circuit.

Figure 2A:
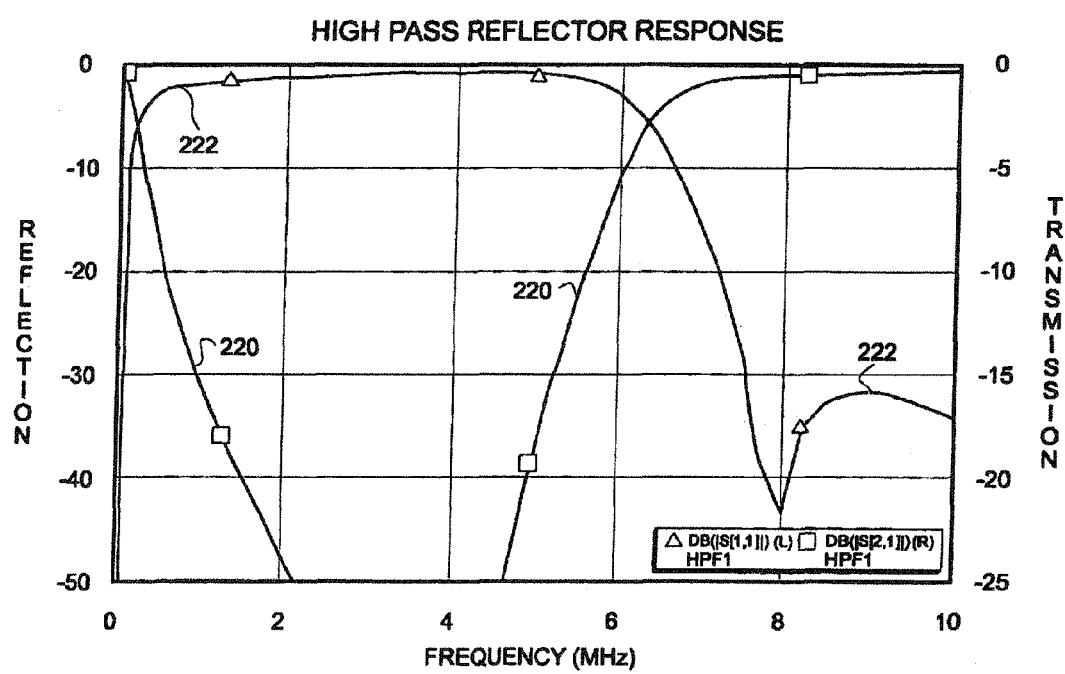
FIG. 2a is a graphical representation of the electrical performance of the reflector circuit of FIG. 1.

The performance of the exemplary high-pass reflector circuit 200 can be seen in the graph of FIG. 2a. The low end of the CATV reverse band usually begins at approximately 5 MHz. In the illustrated case, the transmission response (S21) 220 begins at 7 MHz as the attenuation approaches zero. The reflection response (S11) 222 reaches its maximum at about 5 MHz, indicating that the signals at 5 MHz and below are almost totally reflected. The power-passing feature is seen at the left-hand portion of the graph, wherein the attenuation approaches zero while the reflection drops off-scale. Power line frequencies are typically between zero and 120 Hz, although it will be appreciated that the invention may be configured to pass higher frequencies if desired.

A premises RF network 109 connected to a public CATV network 101 (FIG. 1) may also contain other signal frequencies traveling or reflected toward the public network. For example, cable modems and program tuners utilize the reverse band between 5 and 42 MHz to send signals to the public network. However, in certain RF network applications, other signals in the forward band above 50 MHz may also be traveling toward the public network. These signals must be blocked at the demarcation point between the public and private networks. This can be accomplished, inter alia, by adding an RF amplifier at the input to the private network. Since amplifiers are directional, signals entering the output of the amplifier in the forward band will be blocked from entering the public network.

Figure 3:
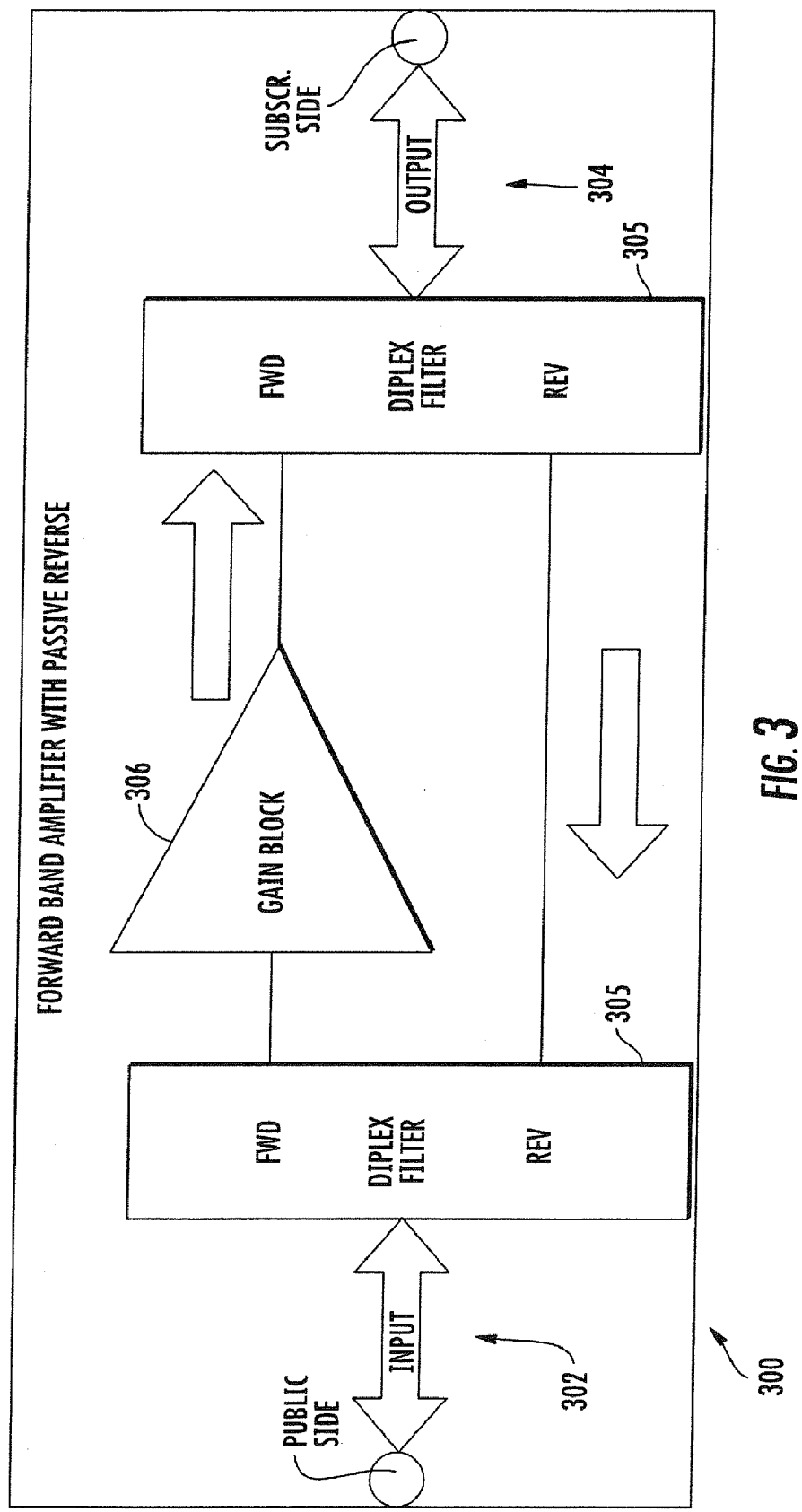
FIG. 3 is a functional block diagram of a typical subscriber isolation amplifier implementation according to the invention.
Figure 4:
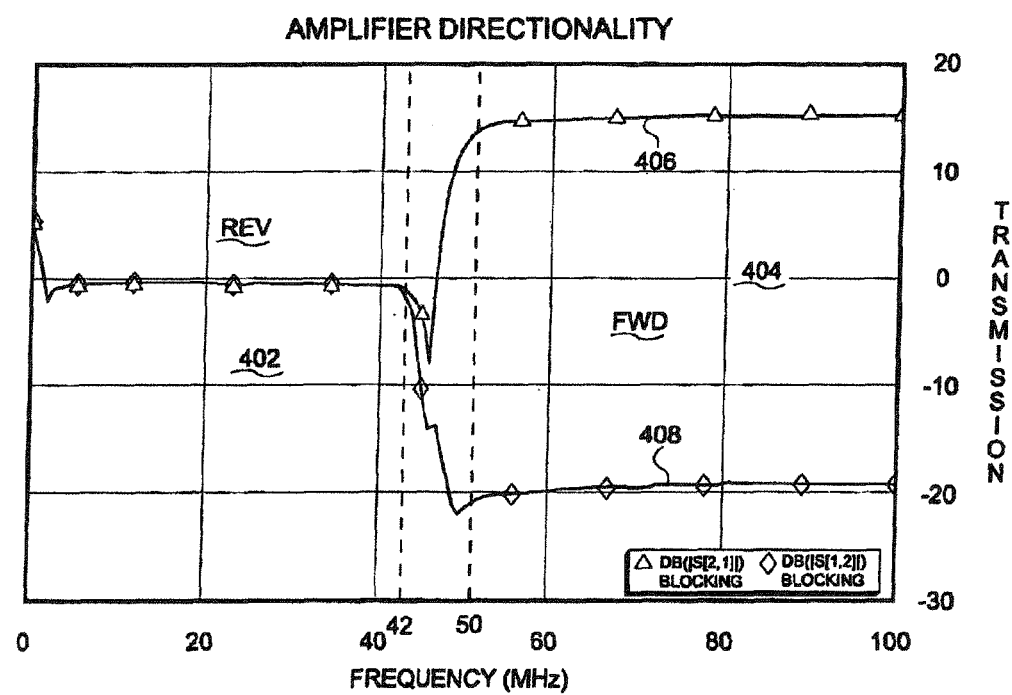
FIG. 4 is a graphical representation of the transmission response of a subscriber isolation amplifier in both directions.

FIG. 3 illustrates a typical isolation amplifier circuit configuration 300 useful with, inter alia, a CATV network of the type shown in FIG. 1. The circuit 300 comprises an input 302, output 304, diplex filter(s) 305, and a gain or amplifier block 306. The directionality or blocking capability of the amplifier circuit 300 can be seen clearly in FIG. 4. The graph of FIG. 4 shows the transmission response in both forward and reverse directions. Note that the reverse band 402 shows nearly zero (0 db) attenuation in either direction (i.e., for curves S21 406 and S12 408), but the forward band 404 is amplified by 15 dB from input 302 to output 304 (S21), and is attenuated by nearly 20 dB from output to input.

Figure 5:
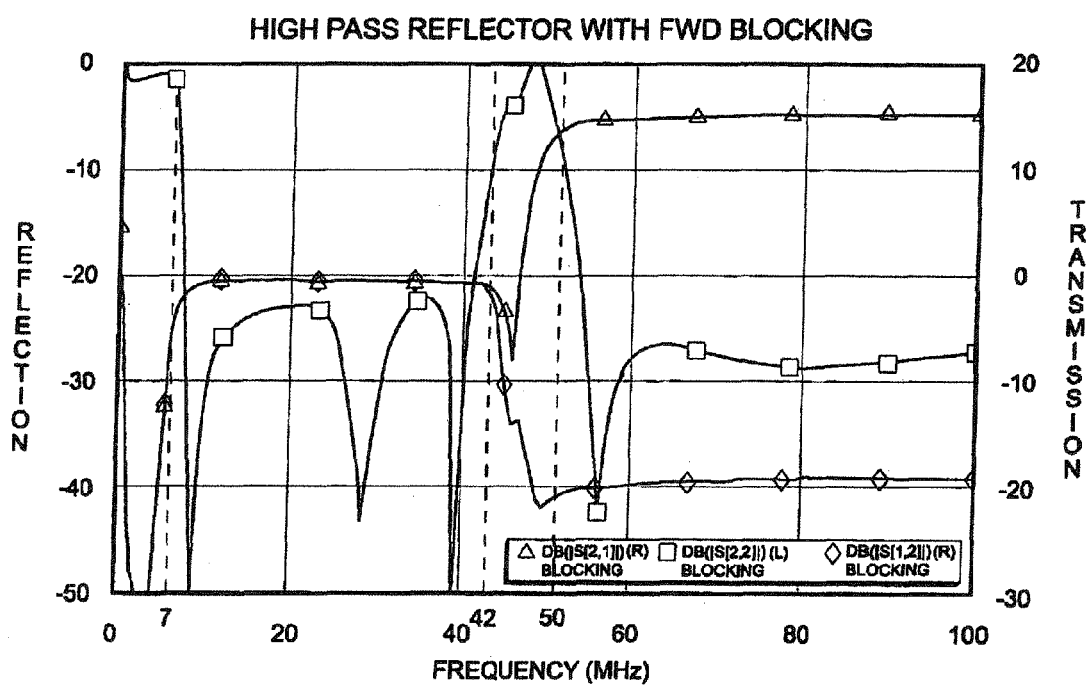
FIG. 5 is a graphical representation of the reflection and transmission response of the amplifier in combination with the high-pass reflector circuit of FIG. 2.

Hence, in the illustrated embodiment, the frequency response of the invention comprises a forward band response typically extending to 1 GHz, with: (i) signals below 5 MHz from the private network are reflected back into the private network; (ii) signals between 7 MHz and 42 MHz are free to enter the public network; and (iii) signals above 50 MHz are free to enter the private network but are blocked from entering the public network. FIG. 5 illustrates the composite performance of the exemplary circuit 200 of FIG. 2, coupled with the isolation amplifier capability provided by the circuit 300 of FIG. 3 (e.g., when embodied as separate but complementary devices within the demarcation point, or alternatively when integrated into a single device). It will be appreciated that other frequency bands (including those having more or less "crossover" than that illustrated in FIG. 4) may be used as well.

The high-pass reflector with blocking capability of the illustrated embodiment comprises the combination of an isolation amplifier (e.g., a broadband RF amplifier of the type typically used to amplify the CATV spectrum within the subscriber premise, such as for example the Extreme Broadband Engineering Model IPA1001) and a high-pass reflector, although it will be recognized that other combinations of components may be used to provide the same or similar functionality. The high-pass reflector can be built into the diplex filter(s) 305 of the amplifier circuit 300 (FIG. 3), or it can be added externally to the output of a commercial subscriber amplifier. Most subscriber amplifiers are powered either through a separate power port or through the output port. Since the high-pass reflector can also pass power, the amplifier output port can advantageously be powered through the high-pass filter if desired.

As will be appreciated by those of ordinary skill, numerous possible applications of the reflector device described herein exist in both one-way and two-way passive broadband coaxial networks. The reflector performs controlled isolation splitting (CIS) functions, such as those detailed in co-owned and co-pending U.S. patent application Ser. No. 11/143,119 filed contemporaneously herewith and entitled "CONTROLLED ISOLATION SPLITTER APPARATUS AND METHODS", incorporated herein by reference in its entirety, and can be used in the same applications. However, the reflector blocks signals in the reflected frequency band and therefore prevents the use of these frequencies and the associated services across the reflector. Reflectors also may present the opportunity for multiple transmission paths within the reflected portion of the network if not properly accounted for. For this reason, they may be of less value at high frequencies when rapid symbol rates are needed (such as in digital video) because of the potential for signal cancellation in certain network configurations.

A salient distinguishing factor of the reflector apparatus of the present invention over the prior art is the inclusion or facilitation of an "off-the-shelf" and thus a more cost-effective isolation amplifier (such as the foregoing exemplary Extreme Broadband Engineering Model IPA1001 device). Specifically, by using such components, there is no need to modify the internal signal paths of the amplifier, which reduces both development and device production (manufacturing) costs. As previously described herein, the isolation amplifier works in conjunction with the reflector to produce a two-way communications system that does not block a wide band of channels from entering the premises, yet provides the desired reverse (upstream) performance so as to permit intra-premises communication. It will be recognized, however, that the reflector device of the invention may be practiced without an amplifier if desired, the reverse band isolation being provided by other structures (whether within or outside of the reflector itself). For example, isolation provided by directional couplers and splitters, as well as cable loss in the distribution system outside of the demarcation point, can be used for this purpose. Another advantage of the reflector apparatus of the present invention over the prior art is the generally simplified electrical design. Other prior art approaches, such as that of U.S. patent application 20050005287 to Claussen previously discussed herein, require the use of two or more two-way splitters in the signal path along with a requirement of one or more diplex filters to achieve proper isolation. Hence, the present invention has advantages in both increased simplicity (and ostensibly reliability), lower cost, and improved (i.e., less) signal loss over such prior art configurations. These attributes are significant considerations in many applications, especially those where widespread distribution of the device is contemplated (such as in CATV networks having many subscribers). For example, even a modest reduction in cost, when multiplied by hundreds of thousands or even millions of installed devices, can result in very significant savings to the network operator.

The comparatively simplified design of the present invention also allows for a more compact and lighter form factor. Along these lines, it will also be appreciated that the filter/reflector devices described herein may be integrated with other types of components if desired, whether related to the network over which the content or services are provided, the subscriber node (network), or otherwise. For example, these devices may be integrated with one or more of the set-top boxes or other CPE devices within the given premises, or alternatively within an MHP-compliant satellite receiver unit of the type well known in the art. The filter/reflector devices may also be integrated with a display device as well or in the alternative, so as to provide an "all-in-one" type form factor to the consumer.

Due to their virtual "transparency" to signals within the prescribed bands, the filter/reflector can also advantageously be used in conjunction with (and without interfering with) existing CPE configurations without any modification thereof These devices are also transparent to other functions resident in the CPE operating at the software layers, such as for example the hardware registry described in co-owned and co-pending U.S. patent application Ser. No. 10/723,959 filed Nov. 24, 2003 and entitled "METHODS AND APPARATUS FOR HARDWARE REGISTRATION IN A NETWORK DEVICE", the error logging functionality described in co-owned and co-pending U.S. patent application Ser. No. 10/722,206 filed Nov. 24, 2003 and entitled "METHODS AND APPARATUS FOR EVENT LOGGING IN AN INFORMATION NETWORK", and the display element management functionality described in co-owned and co-pending U.S. patent application Ser. No. 10/773,664 filed Feb. 6, 2004 and entitled "METHODS AND APPARATUS FOR DISPLAY ELEMENT MANAGEMENT IN AN INFORMATION NETWORK", each incorporated herein by reference in their entirety.

The filter/reflector functionality is also consistent with VOD, PVR and related services which require upstream communications, such as for example the high speed data download apparatus and method described in co-owned and co-pending U.S. application Ser. No. 11/013,665 filed Dec. 15, 2004 and entitled "METHOD AND APPARATUS FOR HIGH BANDWIDTH DATA TRANSMISSION IN CONTENT-BASED NETWORKS", also incorporated herein by reference in its entirety.

Similarly, the filter/reflector devices described herein (as well as the aforementioned CIS devices) can advantageously be used with literally any topology of bearer network, such as for example a conventional HFC topology, or alternatively the multi-server architecture described in co-pending and co-owned U.S. patent application Publication No. 20020059619 to Lebar published May 16, 2002 and entitled "Hybrid central/distributed VOD system with tiered content structure" which is incorporated herein by reference in its entirety.

It will further be recognized that the components of the filter/reflector circuits of the present invention (as well as the CIS circuits previously referenced) can be made variable, and/or multiple components or circuits utilized in parallel in order to selectively (or non-selectively) provide two or more accessible frequency bands. For example, in one variant, the filter/reflector devices are configured to provide two discrete non-adjacent frequency bands for use within the premises, wherein multiple devices can communicate via the different bands simultaneously (akin to an FDMA approach). Alternatively, the filter/reflector can be made "tunable", such that an installation technician, head-end supervisory process via computer program(s), or even the customer themselves can adjust the frequency spectrum window(s) either at installation or even during operation. Discrete variable components (such as variable capacitors and inductors) can be utilized if desired to this end.

The devices can even be made self-configuring, roughly akin to well-known "zero-configuration" network devices which self install by obtaining an appropriate IP address at time of installation. The distinction in the present context might comprise, for example, sensing the presence of carrier or other signal within a given frequency band, and then self-tuning the filter/reflector or CIS according to a tuning algorithm or program in order to operate in an unused portion of the spectrum. Hence, "smart" filter splitter circuits having control and/or tuning algorithms running on, e.g., an associated digital processor or microcontroller, are also envisaged under the present invention, although such devices are necessarily more complex and also more costly.

It is further noted that other economic advantages are provided by the exemplary embodiment of the filter/reflector apparatus of FIGS. 2 and 3. Specifically, by structuring these devices as described herein, significant reductions in manufacturing cost can be realized, largely due to the fact that less component precision is required. For example, rather than having to construct a precision filter circuit (which includes higher cost precision electronic components) to create notches or other desired artifacts within the response of the filter, the construction set forth herein lends itself to use of less precise and less costly components. Specifically, filtering at lower frequencies and broader frequency bands typically requires less component value precision.

Furthermore, the exemplary configurations described herein have been demonstrated to be less sensitive to variations in ambient temperature, such as may routinely occur in a user's premises. This reduced temperature sensitivity also allows for the use of lower cost components, since less stringent thermal response performance is required.

One further advantage provided by the present invention(s) relates to the elimination of destructive interference within the premises "network". Specifically, under the prior art, with more than one signal path, signals tend to bounce off of the reflector and sometimes generate destructive interference. The presence of such destructive interference can be significantly impacted by the wiring dimensions and patterns within a given premises, sometimes necessitating partial or complete rewiring. Conversely, under the present invention, these destructive interference issues are greatly mitigated, since intra-premises signals can propagate through the premises splitters, the signals only being reflected by the splitter at the entry point of the premises.

In an alternate embodiment of the invention, the frequency band utilized by the circuit 200 is selected to be other than that of the CATV system. This utilized band may be completely outside the pass-band, or overlap with one or more regions thereof, as desired. For example, in one variant, the band utilized for video content and client device communications is selected to between approximately 1.0 and 1.2 GHz. Since this is above the traditional CATV band, the restriction of signal access from the public network is obviated. Hence, a reflector style band-stop or low-pass filter in the 1-1.2 GHz band can be utilized based on the same principles as the filter circuit used in the embodiment of FIG. 2 previously discussed. In addition, an amplifier is not required for isolation of these signals from the public network in this alternate embodiment, thereby further simplifying the circuit and reducing its manufacturing cost.

Exemplary commercial applications of the foregoing reflector technology include the Motorola BMC9012 and BMC9022 integrated platform devices with Digeo Moxi™. These devices comprise consumer electronics devices that can interact with other devices to enable additional functionality including, inter alia, dual-tuner Digital Video Recording (DVR), HDTV, home or premises networking, and an integrated on-screen menu structure ("Moxi Menu") that allows navigation of entertainment options (i.e., TV, movies, PPV and VOD) via a single interface. See also WIPO Publication No. WO 02/21841 A1 to Perlman published Mar. 14, 2002 and entitled "Multimedia and Computing System", which is incorporated herein by reference in its entirety, which discloses a home media server architecture useful with the present invention.

It will also be appreciated that the Controlled Isolation Splitter (CIS) previously referenced herein can be utilized in such alternate embodiments, provided that the splitter bypass circuit is adapted (tuned) to cover relevant portions of the 800-1200 MHz band. This adaptation is possible with essentially the same component values as previously described.

Band-Stop Reflector

Figure 6:
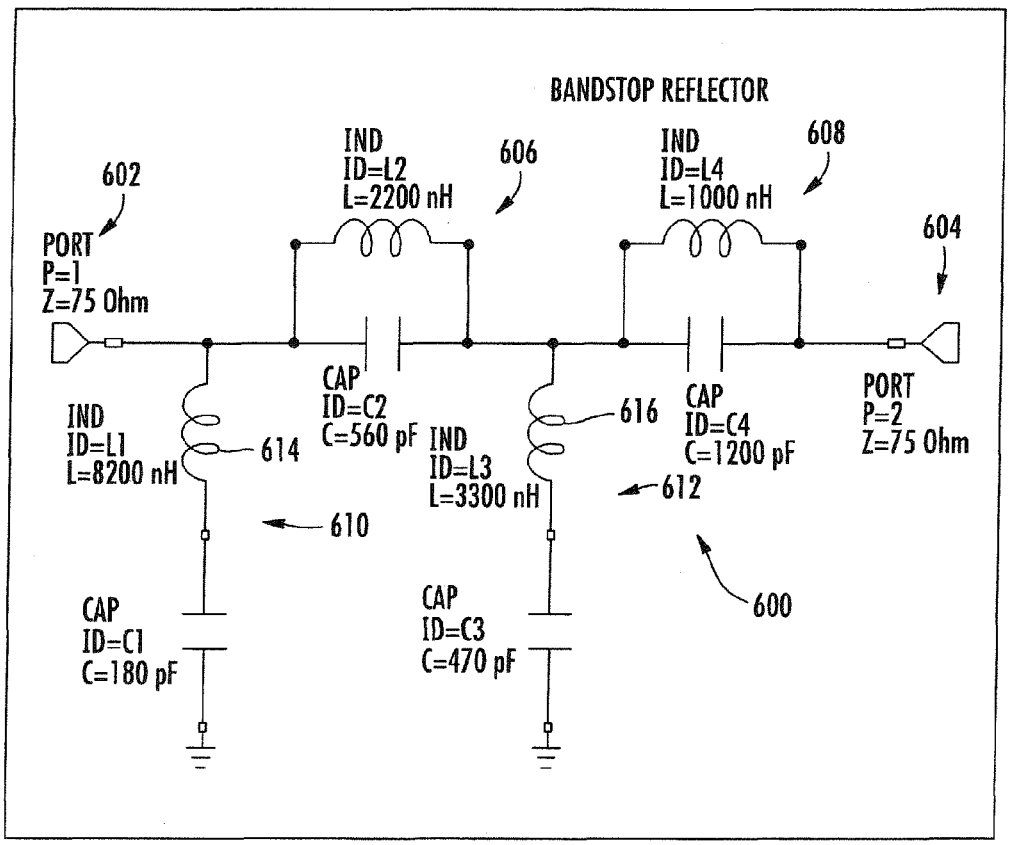
FIG. 6 is a schematic diagram of another exemplary configuration of the reflector circuit of the invention, utilizing a band-stop filter approach.
Figure 6A:
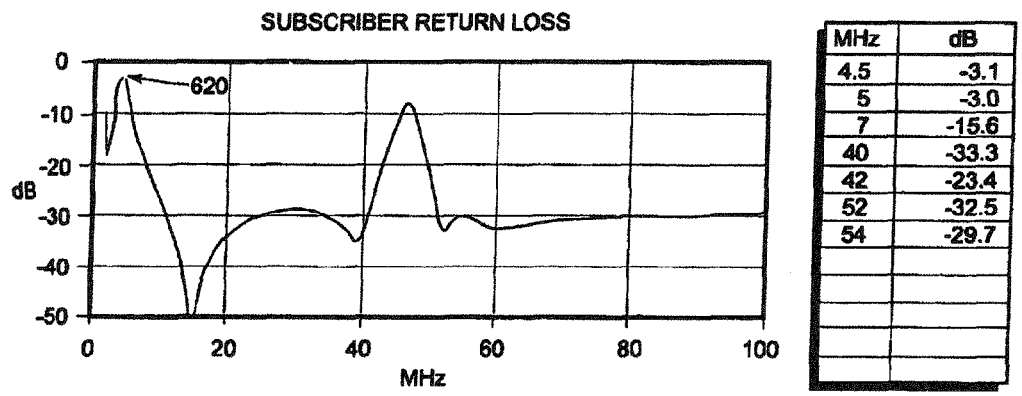
FIGS. 6a and 6b are graphical representations of the subscriber side return loss and reverse transmission loss, respectively, of the band-stop reflector circuit of FIG. 6.
Figure 6B:
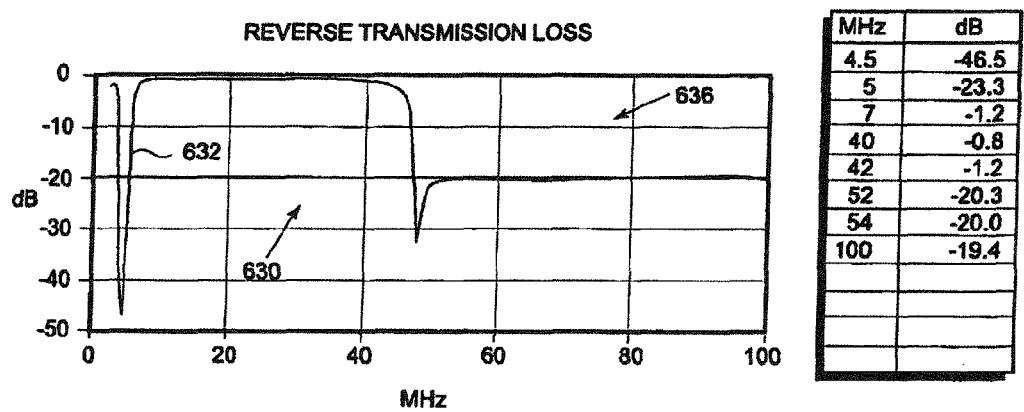

Referring now to FIGS. 6 through 6b, another exemplary embodiment of the reflector circuit of the invention is described, specifically incorporating a band-stop capability. This band-stop reflector design lends itself well to integration with the reverse path diplex filter 305 of the forward band RF amplifier (see FIG. 3). The circuit 600 of FIG. 6 can also replace a stand-alone reflector circuit, such as by adding power-passing LC networks at each end similar to the configuration shown in FIG. 2.

As shown in FIG. 6, the circuit 600 comprises a subscriber-side terminal or node 602 and a network-side terminal 604. Interposed electrically between the two terminals 602, 604 are a series (here, two) sets of parallel inductor/capacitor pairs 606, 608, which are punctuated by a set (again, two) of series inductor/capacitor pairs 610, 612 which are each terminated to a specified potential (e.g., ground). The inductor 614 of the first pair 610 is terminated electrically between the input terminal 602 and the first parallel pair 606, and the inductor 616 of the second pair 612 is terminated between the first and second parallel pairs 606, 608, as shown in FIG. 6.

FIG. 6a illustrates the subscriber return loss profile for the circuit 600 of FIG. 6, as obtained from testing conducted by the inventors hereof. The return loss peak 620 located at approximately 4.5 MHz comprises the reflection from the subscriber side of the demarcation interface 107. The reflector 600 is ideally made part of the diplex filter 305, and can be advantageously realized with compact surface-mount components of normal production tolerance. The power-passing aspect of the reflector 600 is also no longer required, due to its incorporation with the amplifier circuit.

FIG. 6b illustrates the reverse transmission loss profile 630 for the circuit of FIG. 6. The reflector 600 attenuates the 4.5 MHz control carriers transmitted by the CPE 106. The rolloff at the lower band edge 632 (7 MHz) using this design is superior to a comparable high-pass design, and uses fewer components. The forward band reverse isolation profile 636 is also seen in FIG. 6b.

Business Models

Various business models and methods can also be employed consistent with the present invention. For example, in one variant, the improved filter/reflector devices are distributed with or installed as part of new subscriptions or upgrades. In one variant of this approach, the devices are integrated with the installed DSTB provided to the subscriber at inception. The DSTB may comprise, for example, a splitter device (such as the improved CIS previously referenced herein) that provides desired impedance characteristics across its output ports, while utilizing the filter/reflector circuit 200 to provide the desired forward/reverse band blocking and passing capabilities across the input to the DSTB. In this capacity, the DSTB can act as a hub of sorts within the subscriber's premises. Specifically, multiple output ports are provided to which multiple devices may be connected, such devices (and the low-impedance path from output port to output port) forming the basis for the aforementioned premises network 109.

Alternatively, the splitter/reflector devices can be configured as "add-on" parts that can be self-installed by the consumer at the premises, such by merely inserting the filter/reflector in-line between their DSTB and the coaxial cable ingress point from the public network.

The enhanced filter/reflector (and CIS) functionality can also be made selectively enabled, such as via downstream encrypted signaling or command from the head-end to the splitter or other associated equipment which causes the splitter/reflector to reconfigure (i.e., be placed in the circuit path, or tune appropriately), thereby enabling intra-premises communications as previously described. In-band or OOB downstream signaling channels may be used for this purpose, as well as other techniques and/or portions of the available frequency spectrum.

Such functionality could comprise a premium or incentive feature as well if desired, ideally increasing revenue. For example, in the context of content or high-speed data delivery, subscribers having extended frequency range tuners (i.e., those able to utilize the extra portion of the downstream frequency spectrum afforded by the reduced spectral blockage afforded by the present invention) can be allocated additional frequency spectrum, or selectively be tuned to this portion of the spectrum, so as to maximize the performance of their components. Much as the well-known highway "carpool" lane is reserved and left substantially unimpeded or drivers meeting certain criteria (i.e., two or more persons in the vehicle), the added spectrum provided by the present invention can be reserved for premium customers (or those meeting other criteria), and their filters/reflectors selectively activated to make use of this spectrum. Non-premium/non-qualifying subscribers would conversely not be given access, whether by not providing them with the enhanced filter/reflector, or alternatively by simply not enabling it (i.e., allowing them to only operate with a legacy filter/splitter that is also installed in their CPE/demarcation device).

The ability to selectively activate or deactivate the filter/reflector and/or splitter functions may also be used as the basis for a maintenance or other "special function" mode, wherein the MSO can selectively active the filter/reflector to provide enhanced frequency spectrum in support of testing, diagnostics, application download, etc.

It will also be recognized that the present invention can be utilized to provide (enhanced) in-premises or in-home computer networking capabilities via, e.g., installation of the reflector within RF modems. This approach allows the use of in-premises coaxial or other such cabling as the basis for a local network, as previously described herein.

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims.

What is claimed is:

1. Radio frequency interface apparatus, comprising a multifunction circuit for use in a network, said apparatus being adapted to:
   substantially attenuate and strongly reflect first signals within a first frequency band and traveling through said circuit in a first direction relative to said apparatus, said reflection of said first signals being utilized to provide communication between at least two devices of said network;
   selectively pass second signals within a second frequency band and traveling through said circuit in said first direction;
   selectively pass substantially all of third signals within both said first and second frequency bands and traveling through said circuit in a second direction relative to said apparatus; and
   pass an alternating current (AC) power signal in at least one of said first and/or second directions using at least said circuit;
   wherein
     said first direction comprises an upstream direction; and
     the second direction comprises a downstream direction.

2. The apparatus of claim 1, wherein said power signal frequency is 120 Hz or less.

3. The apparatus of claim 2, further comprising a splitter circuit having at least two output ports, said splitter being electrically coupled to said apparatus and adapted to pass signals between said two output ports without significant signal loss.

4. The apparatus of claim 1, further comprising a plurality of capacitors arranged in a substantially series disposition so as to form a plurality of nodes therebetween, and a plurality of inductors electrically coupled to respective ones of said nodes.

5. The apparatus of claim 1, wherein said network comprises a CATV network, and said second frequency band comprises frequencies below approximately 42 MHz.

6. The apparatus of claim 5, wherein said first band comprises frequencies above approximately 50 MHz.

7. The apparatus of claim 1, and said apparatus further adapted to pass at least two of said first, second and third signals simultaneously.

8. The apparatus of claim 1, further adapted to simultaneously pass a first portion of said third signals within said first frequency band with a first gain, and a second portion of said third signals within said second frequency band with a second gain.

9. The apparatus of claim 8, wherein said first gain is greater than said second gain, and both said first and second gains are greater than or equal to approximately 0 db.

10. The radio frequency interface apparatus of claim 1, further comprising an isolation amplifier, said isolation amplifier being configured to selectively pass at least portions of said second and third signals.

11. The radio frequency interface apparatus of claim 10, wherein said apparatus is adapted to simultaneously pass a first portion of said third signals within said first frequency band with a first gain, and a second portion of said third signals within said second frequency band with a second gain, said first and second gains being determined at least in part by said isolation amplifier.

12. A method for managing frequency spectrum within a radio frequency network having a demarcation point, comprising:
    substantially reflect first signals within a first frequency band and traveling through a circuit in a first direction relative to said demarcation point, said reflection of said first signals being utilized for communication between two or more devices located in a portion of said network downstream of said demarcation point;
    passing second signals within a second frequency band and traveling through said circuit in said first direction;
    passing third signals within both said first and second frequency bands and traveling through said circuit in a second direction relative to said point; and
    passing an alternating current (AC) power signal in at least one of said first and second directions using at least a portion of said circuit;
    wherein
      said network comprises a radio frequency network;
      said second band comprises frequencies below approximately 42 MHz;
      said first band comprises frequencies above approximately 50 MHz;
      said first direction comprises an upstream direction, and the second direction comprises a downstream direction.

13. The method of claim 12, wherein said radio frequency network comprises a public cable television network and a premises network, said demarcation point being disposed substantially at an interface between said public network and said premises network, and said act of substantially attenuating comprises substantially attenuating signals within said first band and traveling from said at least one private network to said public network to a value less than 0 db.

14. Reflector apparatus for use in a network, said apparatus comprising a multifunction circuit and being adapted to:
    substantially reflect first signals within a first frequency band and traveling in a first direction relative to said apparatus, said reflection of said first signals being generated for communication between two or more devices disposed within a portion of said network downstream of said reflector apparatus using at least said circuit;
    substantially pass second signals within a second frequency band and traveling in said first direction using at least said circuit;
    substantially pass third signals within said second frequency band and traveling in a second direction relative to said apparatus using at least said circuit; and
    substantially pass fourth signals in a third frequency band, said third band being lower in frequency than said first or second bands using at least said circuit;

wherein:
said network comprises a cable television network;
said first band comprises frequencies from approximately 5 MHz down to approximately the top portion of said third band; and
said second band comprises frequencies above approximately 7 MHz.

15. The reflector apparatus of claim 14, further comprising an isolation amplifier electrically coupled to said apparatus, said isolation amplifier being adapted to selectively control at least portions of a transmission spectrum of said apparatus, said spectrum providing for transmission in both of said first and second directions.

16. The reflector apparatus of claim 14, wherein said fourth signals comprise alternating current (AC) power signals, and said third band comprises frequencies at or below 120 Hz.

17. The reflector apparatus of claim 16, wherein said network comprises at least a subscriber-side network in signal communication with said reflector apparatus, and said reflector apparatus further comprises a splitter circuit adapted to provide a low impedance path between two nodes of said subscriber-side network.

18. The reflector apparatus of claim 14, wherein said apparatus comprises a plurality of capacitors arranged in a substantially series disposition so as to form a plurality of nodes therebetween, and a plurality of inductors electrically coupled to respective ones of said nodes.

19. The reflector apparatus of claim 14, wherein said fourth signals comprise AC or DC power signals, and said top of said fourth band comprises a frequency of approximately 120 Hz.

20. The reflector apparatus of claim 14, wherein said apparatus is further adapted to pass signals above 50 MHz with a positive gain in said second direction, yet substantially attenuate signals above 50 MHz in said first direction.

21. Interface apparatus for use in a content-based network comprising:
an input port for coupling to a public portion of said network;
an output port for coupling to a subscriber portion of said network; and
a circuit including an isolation amplifier disposed electrically between said input and output ports;
wherein said circuit is adapted to:
(i) strongly reflect signals traveling from said output port toward said input port falling within a first frequency band, said reflected signals being generated for communication between two or more devices located on said subscriber portion of said network;
(ii) pass substantial portions of signals traveling from said output port toward said input port falling within a second frequency band; and
(iii) attenuate signals traveling from said output port toward said input port falling within a third frequency band.

22. The apparatus of claim 21, wherein said second frequency band comprises a band encompassing DC through 120 Hz, and said first band is higher in frequency than 120 Hz at all frequencies therein.

23. The apparatus of claim 22, wherein said amplifier provides a transmission profile which provides a positive gain to signals falling within said third frequency band and traveling from said input port to said output port.

24. The apparatus of claim 22, wherein said amplifier provides a transmission profile which provides a substantially zero gain for at least some signals with frequencies falling below said third band, irrespective of their direction of travel.

25. Reflector circuit apparatus adapted for use in a content-based network, comprising:
a plurality of capacitive elements placed in series between a first terminal and a second terminal, said capacitive elements forming a plurality of individual nodes, each of said nodes being located electrically between two of said capacitive elements; and
a plurality of inductive elements, wherein a first end of each one of said plurality of inductive elements is electrically coupled to at least one of said nodes, and a second end of each of a first group of said plurality of inductive elements is electrically coupled directly to ground potential, and a second end of each of a second group of said plurality of inductive elements is electrically coupled to a first end of at least one of a second plurality of capacitive elements, said at least one capacitive element also being electrically coupled to ground potential;
wherein said reflector circuit is configured to non-incidentally reflect at least first upstream signals within a designated frequency band for communication between said first and second terminals.

26. The apparatus of claim 25, wherein said apparatus is adapted to provide power-passing capability, and further comprises at least one amplifier in signal communication with said reflector circuit, said amplifier providing for substantially gain-less transmission of signals in either direction through said circuit within a first frequency band, and transmission of signals with either a positive or negative gain, depending on direction of travel, within a second frequency band, said second frequency band having upper and lower frequencies which are higher than both the upper and lower frequencies of said first band.

27. The apparatus of claim 26, wherein said positive gain transmission is provided in a downstream direction of signal travel, and said negative gain transmission is provided in an upstream or reverse direction of signal travel.

28. The apparatus of claim 25, wherein at least a portion of said capacitive and inductive elements form a filter circuit selected from the group consisting of: (i) a band-stop filter, and (ii) a low-pass filter; and
wherein the frequency band utilized by the apparatus is selected to be other than that of the pass-band of the content-based network.

29. In a cable network comprising a public portion and a subscriber portion, a method of doing business, comprising:
providing interface apparatus adapted to be installed at a demarcation point between said public portion and said subscriber portion, said interface apparatus being adapted to selectively control the available frequency spectrum in both of upstream and downstream directions;
providing first services to said subscriber portion with said interface apparatus operating in a first mode;
selectively causing said interface apparatus to operate in a second mode; and
providing second services to said subscriber portion with said interface apparatus operating in said second mode;
wherein
said first service comprises passing signals downstream and upstream; and
said second service comprises substantially reflecting upstream signals within a frequency band below approximately 42 MHz for communication with another apparatus located within said subscriber portion.

30. The method of claim 29, wherein said act of selectively causing comprises:
  receiving indication that said subscriber is eligible for said second services; and
  transmitting at least one signal to said interface apparatus to cause said operation in said second mode.

31. The method of claim 29, wherein said first mode comprises one providing a first available frequency spectrum, and said second mode comprises one providing a second available spectrum, said second spectrum being greater in size than said first spectrum.

32. A method for providing subscriber-side networking capability within a cable network having a public portion, subscriber-side network, and a demarcation point, comprising:
  substantially reflecting first signals within a first frequency band and traveling towards said demarcation point within said subscriber-side network, wherein said reflection of said first signals are utilized at least in part to provide communications between individual nodes within said subscriber-side network;
  passing second signals within a second frequency band, said second signals also traveling towards said demarcation point within said subscriber-side network; and
  passing third signals within both said first and second frequency bands, said third signals traveling away from said demarcation point within said subscriber-side network.

33. Reflector circuit apparatus adapted for use in a content-based network, comprising:
  a first plurality of capacitive elements placed in series between a first terminal and a second terminal, said first plurality of capacitive elements forming a plurality of individual nodes, each of said nodes being located electrically between two of said capacitive elements;
  a first plurality of inductive elements disposed in electrical parallel with respective ones of said first plurality of capacitive elements; and
  a second plurality of inductive elements, wherein a first end of each one of said second plurality of inductive elements is electrically coupled to at least one of said nodes, and a second end of each of said plurality of inductive elements is electrically coupled in series to at least one of a second plurality of capacitive elements, said at least one of a second plurality of capacitive elements also being electrically coupled to ground potential;
  wherein said reflector circuit is configured to strongly reflect a plurality of signals travelling in a first direction relative said circuit and within a designated frequency band for communication between devices located on a downstream portion of said reflector circuit apparatus.

* * * * *